US009557924B2

(12) United States Patent
Coronado et al.

(10) Patent No.: US 9,557,924 B2
(45) Date of Patent: Jan. 31, 2017

(54) ANTI-VIRUS SCAN VIA A SECONDARY STORAGE CONTROLLER THAT MAINTAINS AN ASYNCHRONOUS COPY OF DATA OF A PRIMARY STORAGE CONTROLLER

(71) Applicant: INTERNATIONAL BUSINESS MACHINES CORPORATION, Armonk, NY (US)

(72) Inventors: Juan A. Coronado, Tucson, AZ (US); Sara M. Coronado, Tucson, AZ (US); Christina A. Lara, Tucson, AZ (US); Lisa R. Martinez, Escondido, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 14/248,265

(22) Filed: Apr. 8, 2014

(65) Prior Publication Data
US 2015/0286437 A1     Oct. 8, 2015

(51) Int. Cl.
*G06F 7/08*     (2006.01)
*G06F 3/06*     (2006.01)
*G06F 21/56*    (2013.01)

(52) U.S. Cl.
CPC ............. *G06F 3/0619* (2013.01); *G06F 3/065* (2013.01); *G06F 3/067* (2013.01); *G06F 3/0617* (2013.01); *G06F 3/0623* (2013.01); *G06F 21/562* (2013.01)

(58) Field of Classification Search
None
See application file for complete search history.

(56) References Cited

U.S. PATENT DOCUMENTS

| | | | |
|---|---|---|---|
| 7,523,487 B2 * | 4/2009 | Muhlestein | G06F 21/562 713/155 |
| 7,774,391 B1 | 8/2010 | Le et al. | |
| 7,962,956 B1 * | 6/2011 | Liao | G06F 21/568 726/13 |
| 2002/0194212 A1 | 12/2002 | Grupe | |
| 2003/0191957 A1 * | 10/2003 | Hypponen | H04L 63/145 726/24 |
| 2004/0010732 A1 | 1/2004 | Oka | |

(Continued)

FOREIGN PATENT DOCUMENTS

| | | |
|---|---|---|
| JP | 2007102697 | 4/2007 |
| JP | 2009087023 | 4/2009 |
| JP | 2009110225 | 5/2009 |

OTHER PUBLICATIONS

Y. Miretskiy, "An On-Access Anti-Virus File System", Stony Brook University, Appears in the proceedings of the 13th USENIX Security Symposium, 2004, pp. 16.

(Continued)

*Primary Examiner* — Nabil El Hady
(74) *Attorney, Agent, or Firm* — Rabindranath Dutta; Konrad Raynes Davda & Victor LLP

(57) ABSTRACT

Provided are a method, a system, and a computer program product in which a secondary storage controller copies a file stored in a primary storage controller. The secondary storage controller performs an anti-virus scan on the copied file. A result of the anti-virus scan is transmitted to the primary storage controller.

21 Claims, 11 Drawing Sheets

(56) References Cited

U.S. PATENT DOCUMENTS

| | | | |
|---|---|---|---|
| 2004/0158741 A1* | 8/2004 | Schneider | G06F 21/562 |
| | | | 726/24 |
| 2005/0149749 A1* | 7/2005 | Van Brabant | G06F 21/567 |
| | | | 726/24 |
| 2006/0005048 A1 | 1/2006 | Osaki et al. | |
| 2006/0047929 A1* | 3/2006 | Otani | G06F 3/0623 |
| | | | 711/162 |
| 2006/0137013 A1 | 6/2006 | Lok | |
| 2008/0047013 A1 | 2/2008 | Claudatos et al. | |
| 2009/0089880 A1* | 4/2009 | Kobayashi | G06F 21/56 |
| | | | 726/24 |
| 2009/0113151 A1* | 4/2009 | Teranishi | G06F 21/564 |
| | | | 711/162 |
| 2010/0235916 A1 | 9/2010 | Radatti | |
| 2011/0153571 A1* | 6/2011 | Walker | G06F 11/1435 |
| | | | 707/654 |
| 2011/0197279 A1 | 8/2011 | Ueoka | |
| 2011/0231934 A1* | 9/2011 | Davis | H04L 63/1408 |
| | | | 726/24 |
| 2012/0011361 A1 | 1/2012 | Guerrero et al. | |
| 2012/0030766 A1 | 2/2012 | Tarbotton et al. | |
| 2013/0179972 A1 | 7/2013 | Coronado et al. | |
| 2014/0007239 A1* | 1/2014 | Sharpe | G06F 21/561 |
| | | | 726/24 |
| 2014/0059687 A1 | 2/2014 | Coronado et al. | |

OTHER PUBLICATIONS

J. Dickenson, "How to Use Multilayered Security to Defeat Viruses", The New Anti-Virus Formula, Copyright 2005 IronPort Systems, Inc., pp. 19.

US Application Serial No. Unknown, filed Apr. 8, 2014.

English translation of JP2009110225.

English translation of JP2009087023.

Office Action dated Dec. 23, 2015, pp. 20, for U.S. Appl. No. 14/248,266, filed Apr. 8, 2014.

Response dated Mar. 23, 2016, pp. 14, to Office Action dated Dec. 23, 2015, pp. 20, for U.S. Appl. No. 14/248,266, filed Apr. 8, 2014.

Final Office Action dated Jul. 22, 2016, pp. 22, for U.S. Appl. No. 14/248,266, filed Apr. 8, 2014.

Response dated Oct. 24, 2016, pp. 16, to Final Office Action dated Jul. 22, 2016, pp. 22, for U.S. Appl. No. 14/248,266, filed Apr. 8, 2014.

* cited by examiner

ANTI-VIRUS SCAN VIA A SECONDARY STORAGE CONTROLLER THAT MAINTAINS AN ASYNCHRONOUS COPY OF DATA OF A PRIMARY STORAGE CONTROLLER

BACKGROUND

1. Field

Embodiments relate to an anti-virus scan via a secondary storage controller that maintains an asynchronous copy of data of a primary storage controller.

2. Background

In certain storage systems, a primary storage controller that provides input/output (I/O) access to files may be coupled to a secondary storage controller. The primary storage controller and the secondary storage controller may include computational devices and/or storage devices. The secondary storage controller may store backup copies of files stored on the primary storage controller. The backup copies may be generated asynchronously by copying files from the primary storage controller to the secondary storage controller. While asynchronous copy operations are in progress, the primary storage controller may continue to respond to input/output (I/O) requests that are received from a host or other computational devices.

A virus is a piece of code that may be maliciously introduced into a computer system to have a detrimental effect, such as a corruption in the computer system or a destruction of data stored in the computer system. Anti-virus protection is desirable in storage systems in order to ensure data integrity and data protection. In certain situations, an anti-virus application may execute in the primary storage controller. During the execution of the anti-virus application any virus that may have infected the files controlled by the primary storage controller are identified and such viruses may be quarantined or removed.

SUMMARY OF THE PREFERRED EMBODIMENTS

Provided are a method, a system, and a computer program product in which a secondary storage controller copies a file stored in a primary storage controller. The secondary storage controller performs an anti-virus scan on the copied file. A result of the anti-virus scan is transmitted to the primary storage controller.

In certain embodiments, the primary storage controller responds to input/output (I/O) requests while the anti-virus scan on the copied file is being performed on the secondary storage controller.

In additional embodiments the file is copied asynchronously from the primary storage controller to the secondary storage controller, wherein while the file is being copied asynchronously the primary storage controller responds to additional I/O requests, and wherein the primary storage controller does not have adequate spare processing cycles to perform the anti-virus scan.

In further embodiments, the result includes an identification of a virus in the file. The secondary storage controller quarantines the files, and communicates the identification of the virus to the primary storage controller. The secondary storage controller receives changes to be made based on analysis of the virus at the primary storage controller.

In yet further embodiments, the result includes an identification of a virus in the file, and the secondary storage controller repairs the file. The changes to repair the file are transmitted to the primary storage controller.

In certain embodiments, the file is comprised of a plurality of subfiles that are portions of the file, wherein during a subsequent anti-virus scan, the sub-files that have changed since the anti-virus scan are scanned to determine viruses, and the sub-files that have not changed since the anti-virus scan are not scanned to determine viruses.

In further embodiments, the primary storage controller and the secondary storage controller are coupled and part of a storage system. The primary storage controller controls storage devices and allows one or more computational devices to perform I/O operations with respect to the storage devices, and the secondary storage controller stores backup copies of data stored in the primary storage controller.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

The primary storage controller is expected to respond to I/O requests that attempt to access storage controlled by the primary storage controller. However, once an anti-virus scan starts executing in the primary storage controller it is expected to run to completion and this may be a very time consuming process. During this anti-virus scanning process the files being scanned may be marked read-only and as a result write I/O on such files may be delayed.

In certain embodiments, asynchronous replication is employed to create and maintain secondary copies of data in a secondary storage controller. The secondary storage controller may have minimal direct user access and may function mainly as a target or secondary machine that processes write updates sent from the primary storage controller. This allows for spare processing cycles on the secondary storage controller.

Certain embodiments relate to a method, system, and computer program product for transferring anti-virus scan related requests to the secondary storage controller. By transferring the anti-virus scan request to the secondary storage controller the primary storage controller is freed to service I/O requests while the anti-virus scan is in progress in the secondary storage controller.

In certain embodiments, the anti-virus scan is performed at a secondary storage controller by performing a synchronization of the data between the primary storage controller and the secondary storage controller prior to executing the anti-virus scan. In other embodiments, a large file is divided into sub-files. Only those sub-files that have changed in the primary storage controller since a previous anti-virus scan in the secondary storage controller are subjected to the anti-virus scan in the secondary storage controller.

Exemplary Embodiments

Figure 1:
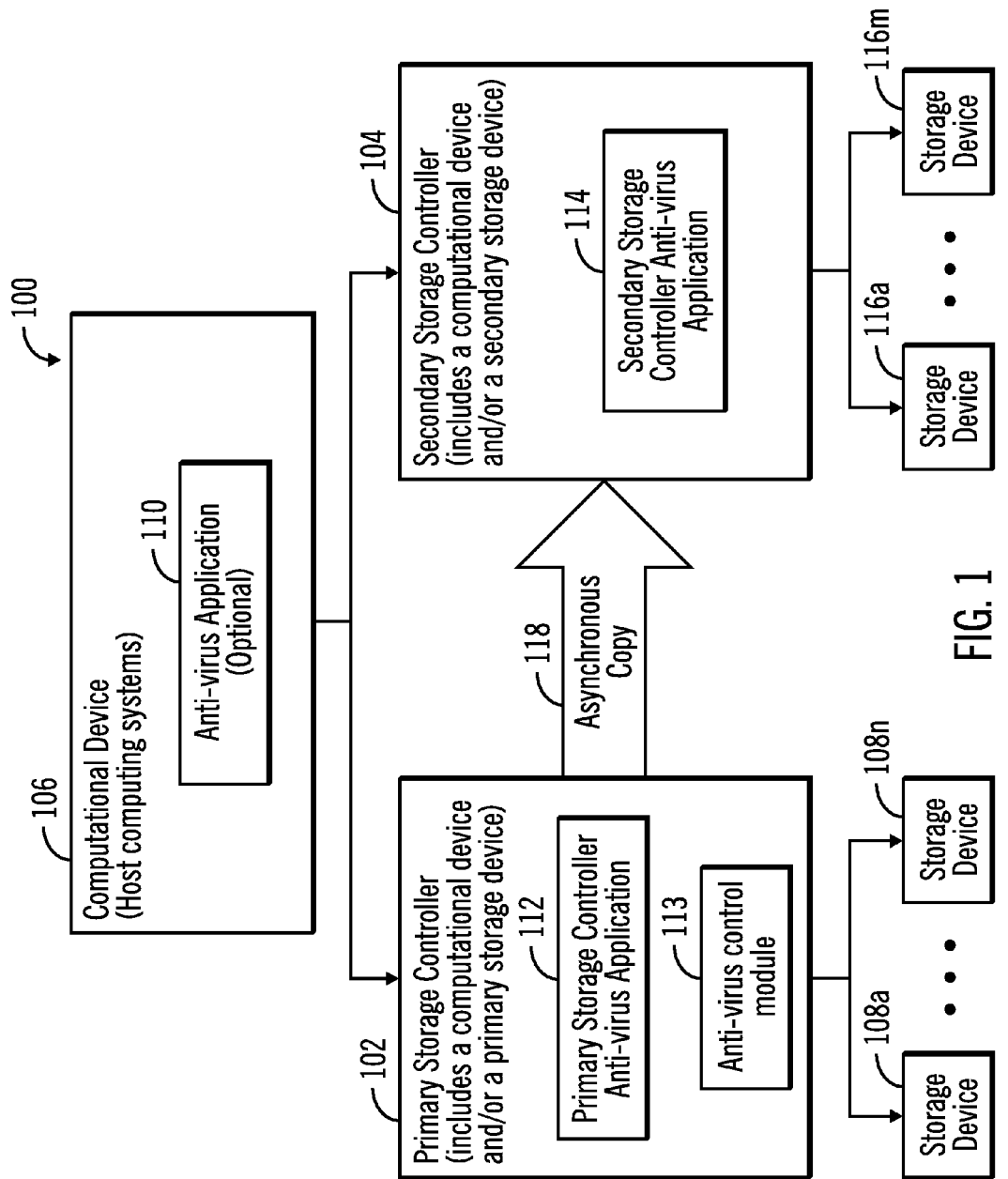
FIG. 1 illustrates a block diagram of a computing environment comprising a primary and secondary storage controller, in accordance with certain embodiments.

FIG. 1 illustrates a block diagram of a computing environment 100 comprising a primary storage controller 102 and secondary storage controller 104, in accordance with certain embodiments. The primary storage controller 102 and the secondary storage controller 104 may be communicatively coupled to each other and to one or more computational devices 106, such as host computing systems. The host computing system 106 may generate I/O requests for the primary storage controller 102 to access data controlled by the primary storage controller 102 and stored in one or more storage devices 108a . . . 108n.

The primary storage controller 102, the secondary storage controller 104, and the computational device 106 may comprise any suitable computational device including those presently known in the art, such as, a personal computer, a workstation, a server, a mainframe, a hand held computer, a palm top computer, a telephony device, a network appliance, a blade computer, a server, a processing device, etc. The computational device 106 and the storage controllers 102, 104 may be elements in any suitable network, such as, a storage area network, a wide area network, the Internet, an intranet. In certain embodiments, the computational device 106 and the storage controllers 102, 104 may be elements in a cloud computing environment.

The primary storage controller 102, the secondary storage controller 104, and the computational device 106 may each include an anti-virus application such as anti-virus applications 110, 112, 114. For the purposes of this disclosure, the anti-virus application 112 that executes on the primary storage controller 102 is referred to as the primary storage controller anti-virus application 112, and the anti-virus application 114 that executes on the secondary storage controller 104 may be referred to as the secondary storage controller anti-virus application 114. In certain alternative embodiments, one or more of the anti-virus application 110, 112, 114 may be optional. For example, in certain embodiments, the anti-virus application 110 may be absent. In other embodiments, initiation of the primary and the secondary storage controller anti-virus applications 112, 114 may be controlled by the anti-virus application 110, and in other embodiments the initiation of the secondary storage controller anti-virus application 114 may be controlled by the primary storage controller anti-virus application 112.

A plurality of storage devices 116a . . . 116m may store asynchronous copy of data copied to the secondary storage controller 104 from the primary storage controller 102 via an asynchronous copy operation 118. During an asynchronous copy process the primary storage controller 102 may perform I/O operations, whereas during a synchronous copy process the primary storage controller 102 is restricted from performing at least write I/O operations while the synchronous copy process is in progress.

In certain embodiments, the primary storage controller 102 may also include an anti-virus control module 113 for distributing anti-virus scanning tasks among a plurality of external computational devices (referred to as anti-virus clients) including the secondary storage controller 104. In many situations in which anti-virus scanning tasks are distributed among external computational devices, the file that is to be scanned for viruses may also have to be transferred.

Therefore, FIG. 1 illustrates certain embodiments in which the secondary storage controller 104 stores asynchronous copy of data and performs anti-virus scan on the asynchronous copy of data and as a result allows the primary storage controller 102 to perform I/O and other operations while the anti-virus scan is in progress. Processing load on the primary storage controller 102 is reduced in comparison to the situations where the anti-virus scan is performed in the primary storage controller 102. Additionally, if the secondary storage controller 104 already stores the asynchronous copy of the data, the file for scanning may not have to be transferred to the secondary storage controller 104 after an anti-virus scan request is received.

Figure 2:
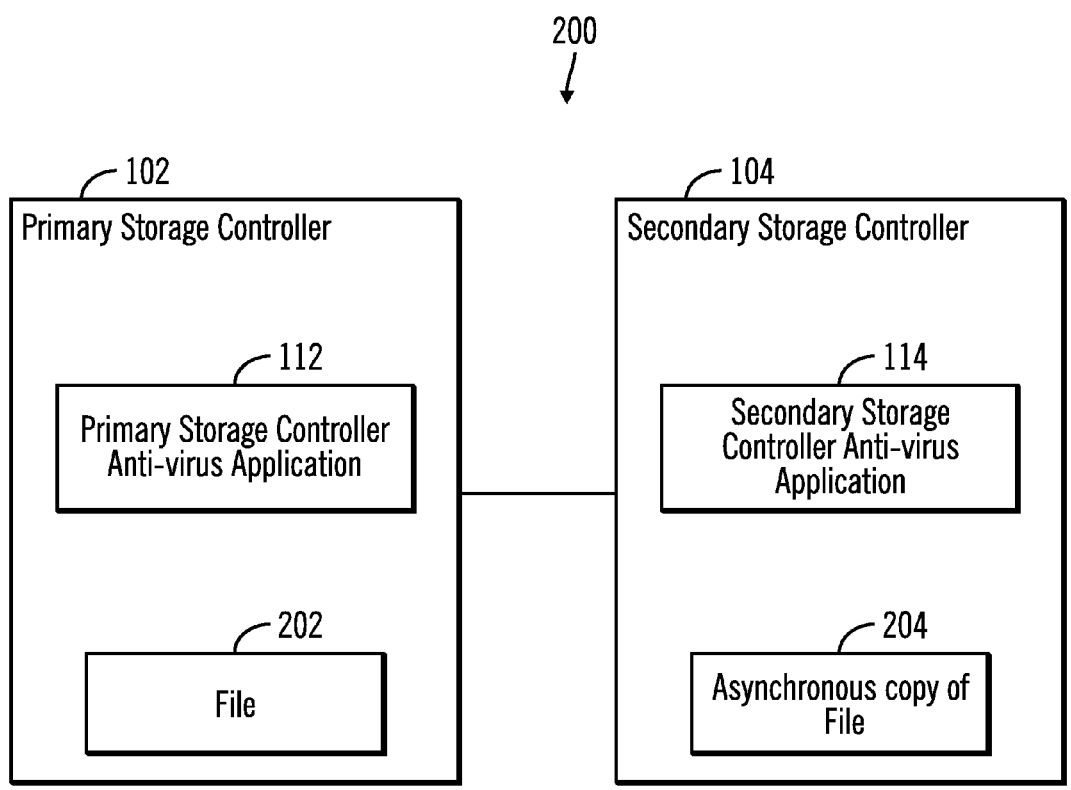
FIG. 2 illustrates a block diagram that shows anti-virus applications and asynchronous copy of files in the secondary storage controller, in accordance with certain embodiments.

FIG. 2 illustrates a block diagram 200 that shows anti-virus applications 112, 114. A file 202 is stored in storage devices controlled by the primary storage controller 102. The secondary storage controller 114 stores an asynchronous copy 204 of file 202 in storage devices controlled by the secondary storage controller 204.

Figure 3:
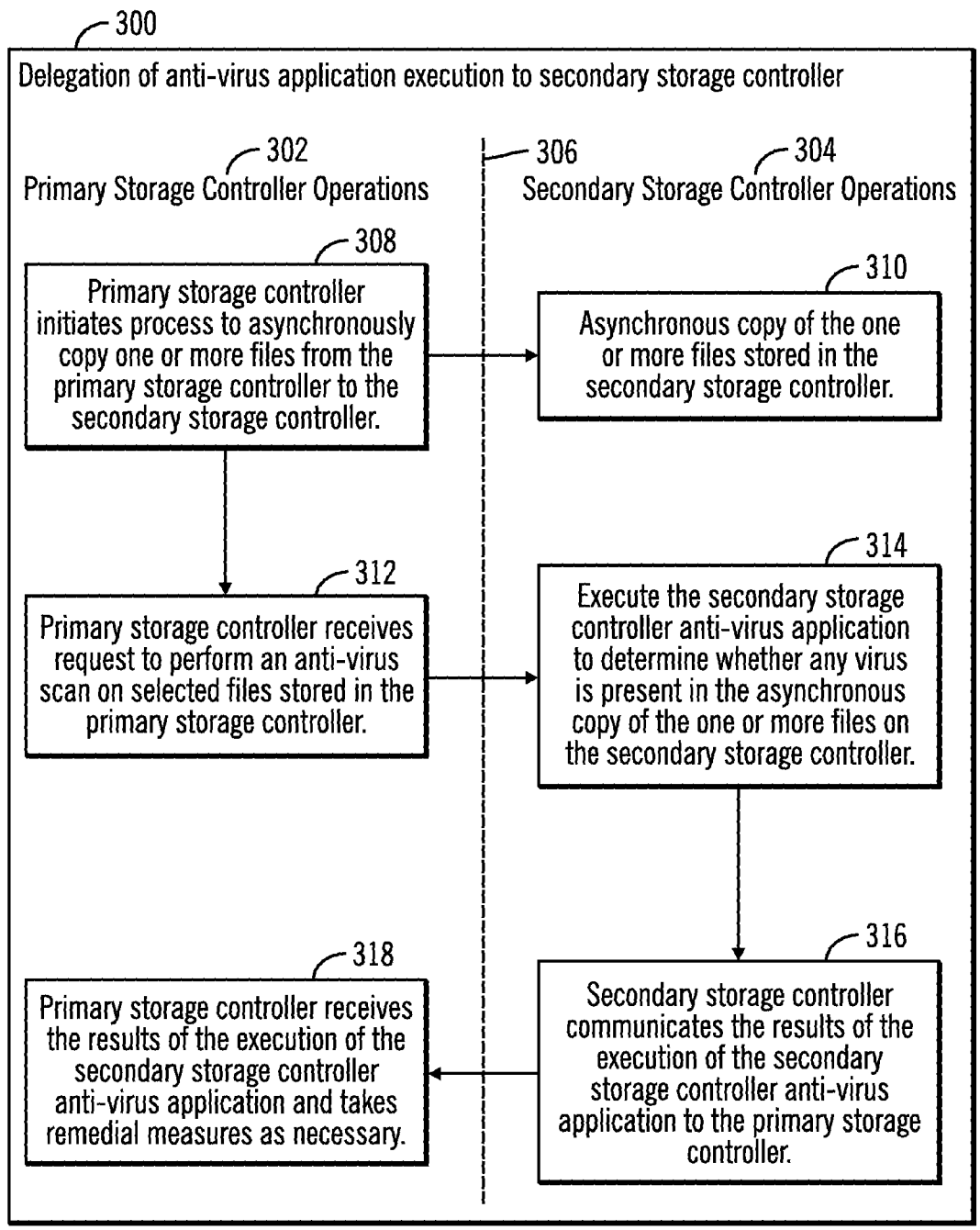
FIG. 3 illustrates a flowchart that shows operations related to delegation of anti-virus application execution to the secondary storage controller, in accordance with certain embodiments.

FIG. 3 illustrates a flowchart 300 that shows operations related to delegation of anti-virus application execution to the secondary storage controller 104, in accordance with certain embodiments. The operations shown in FIG. 3 may be performed by the primary storage controller 102 and the secondary storage controller 104. In FIG. 3 the primary storage controller operations 302 are shown to the left of the dashed line 306, and the secondary storage controller operations 304 are shown to the right of the dashed line 306.

Control starts at block 308 in which primary storage controller 102 initiates a process to asynchronously copy one or more files from the primary storage controller 102 to the secondary storage controller 104. The asynchronous copy of the one or more files are stored (at block 310) in the secondary storage controller 104.

The primary storage controller 102 receives (at block 312) a request to perform an anti-virus scan on selected files stored in the primary storage controller 102, The secondary storage controller anti-virus application 114 is executed (at block 314) to determine whether any virus is present in the asynchronous copy of the one or more files on the secondary storage controller 104.

The secondary storage controller 104 communicates (at block 316) the results of the execution of the secondary storage controller anti-virus application 114 to the primary storage controller 102. The primary storage controller 102 receives (at block 318) the results of the execution of the secondary storage controller anti-virus application 114 and takes remedial measures as necessary Therefore, FIG. 3 illustrates certain embodiments in which anti-virus scanning is offloaded (i.e., transferred) to the secondary storage controller 104 from the primary storage controller 102 to free up processing cycles on the primary storage controller 102.

Figure 4:
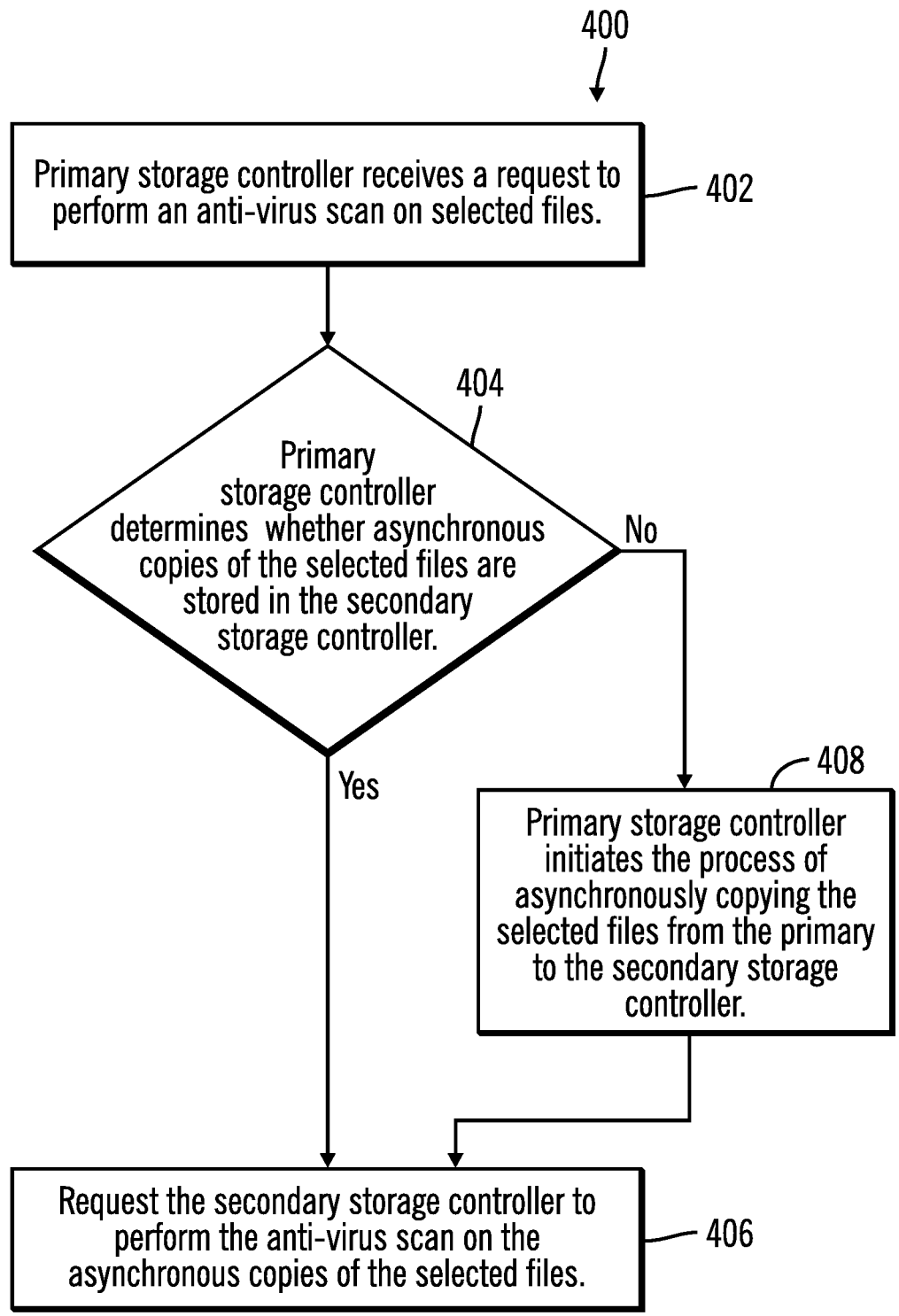
FIG. 4 illustrates a flowchart that shows operations performed by the primary storage controller, in accordance with certain embodiments.

FIG. 4 illustrates a flowchart 400 that shows operations performed by the primary storage controller 102, in accordance with certain embodiments. Control starts at block 402 in which the primary storage controller 102 receives a request to perform an anti-virus scan on selected files. The primary storage controller 102 determines (at block 404) whether asynchronous copies of the selected files are stored in the secondary storage controller 104. If so, the primary storage controller 102 requests (at block 406) the secondary storage controller 104 to perform the anti-virus scan on the asynchronous copies of the selected files. If not the primary storage controller 102 initiates (at block 408) the process of asynchronously copying the selected files from the primary storage controller 102 to the secondary storage controller 104.

Figure 5:
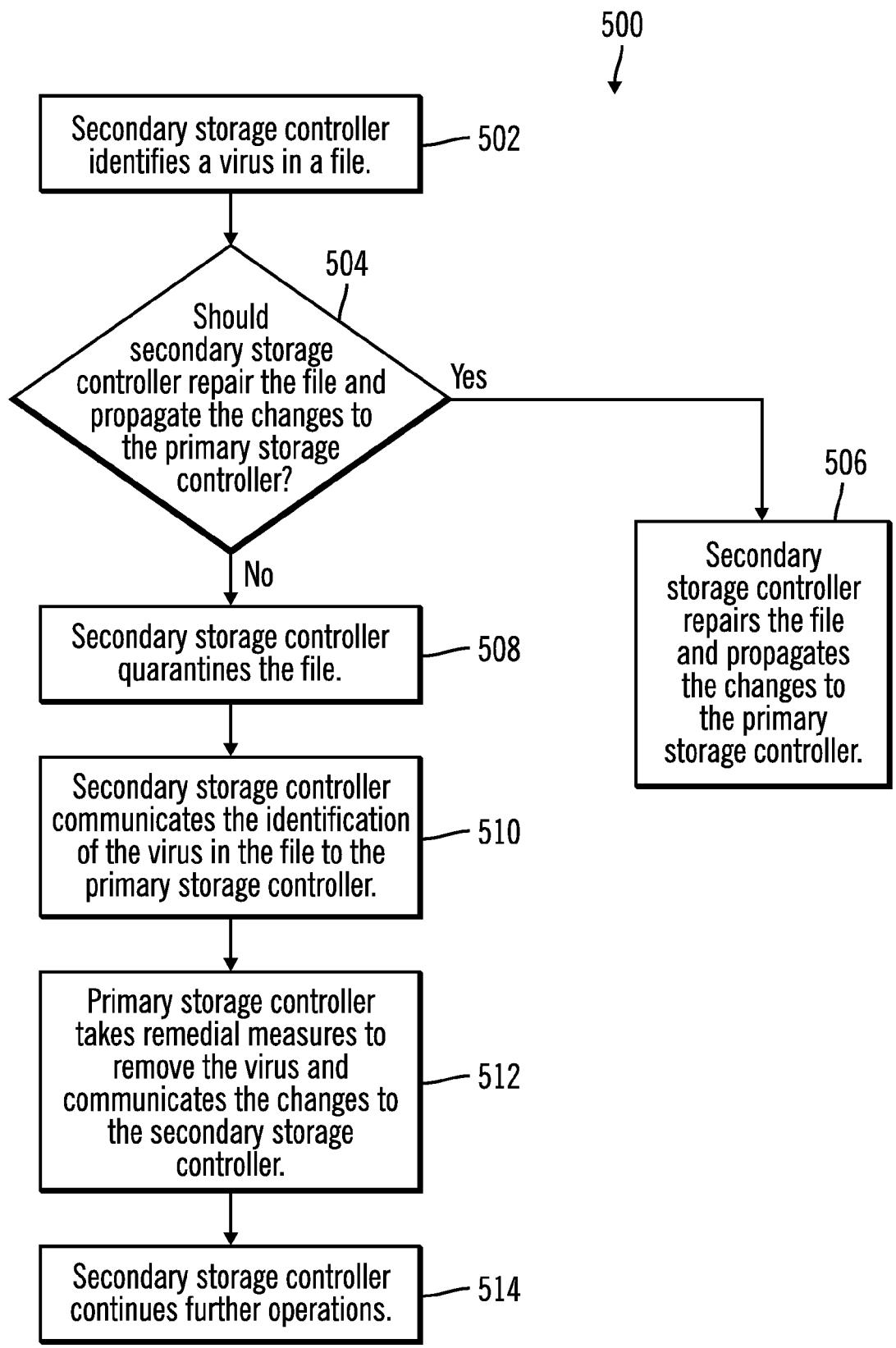
FIG. 5 illustrates a flowchart that shows operations performed in response to an identification of a virus in a file, in accordance with certain embodiments.

FIG. 5 illustrates a flowchart 500 that shows operations performed in response to an identification of a virus in a file, in accordance with certain embodiments. Control starts at block 502 in which the secondary storage controller 104 identifies a virus in a file. A determination is made (at block 504) as to whether the secondary storage controller 104 should repair the file and propagate the changes to the primary storage controller 102. If so, then the secondary storage controller 104 repairs (at block 506) the file and propagates the changes to the primary storage controller 102. If not, then the secondary storage controller 104 quarantines (at block 508) the file.

Control proceeds to block 510 from block 508. At block 510, the secondary storage controller 104 communicates the identification of the virus in the file to the primary storage controller 102. The primary storage controller 102 takes remedial measures (at block 512) to remove the virus and communicates the changes to the secondary storage controller 104, and the secondary storage controller 104 continues (at block 514) further operations.

Figure 6:
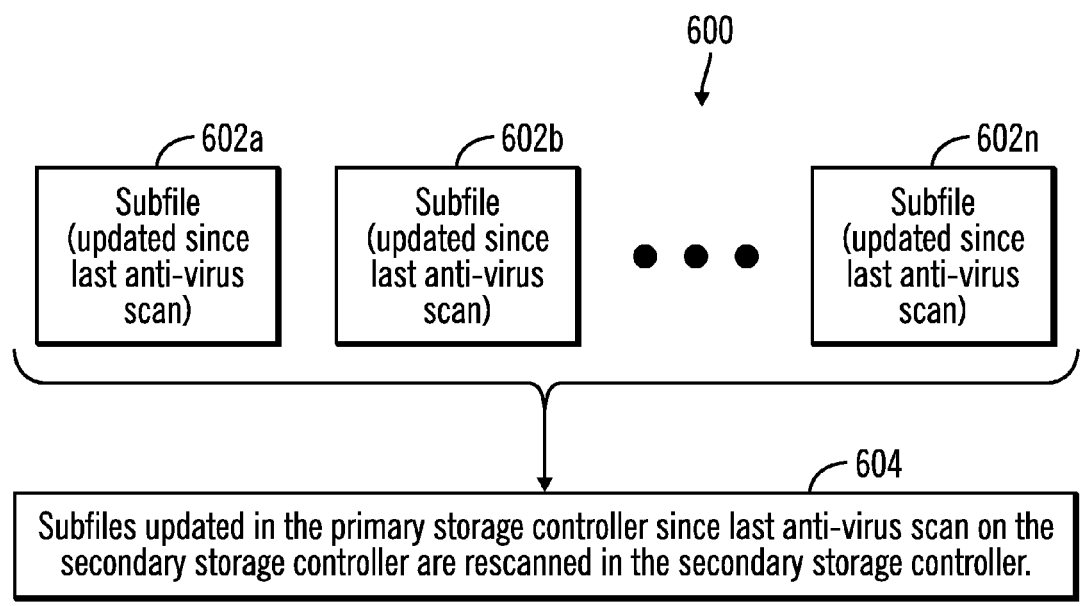
FIG. 6 illustrates a block diagram that shows a file that is divided into smaller sub-files for facilitating anti-virus scanning, in accordance with certain embodiments.

FIG. 6 illustrates a block diagram 600 that shows a file divided into smaller subfiles 602a, 602, . . . , 602n for facilitating anti-virus scanning, in accordance with certain embodiments. The subfiles are smaller portions of a large file. If the large file is not divided into subfiles, then even if a small portion of the file changes the entirety of the large file may have to be scanned for viruses after the change. However, by dividing the large file into smaller subfiles, only the subfiles updated in the primary storage controller 102 since the last anti-virus scan on the secondary storage controller 104 are rescanned (block 604) in the secondary storage controller 104.

Figure 7:
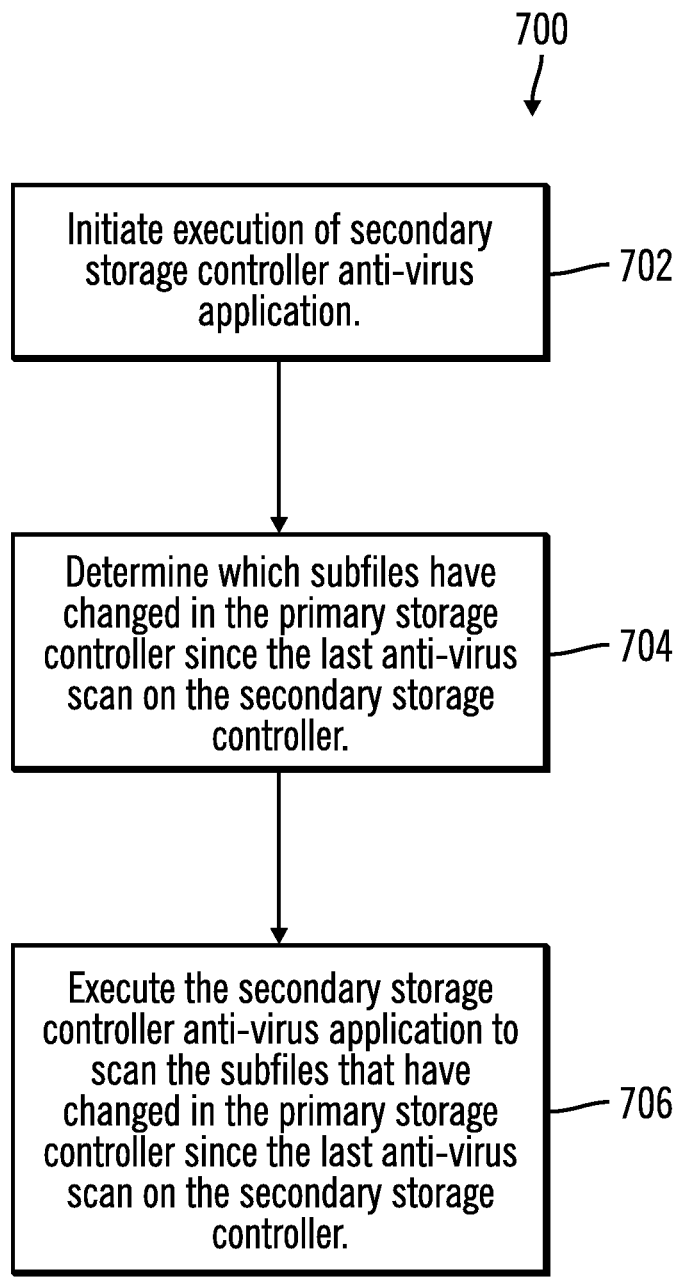
FIG. 7 illustrates a flowchart that shows anti-virus scan on subfiles that have changed since a previous anti-virus scan, in accordance with certain embodiments.

FIG. 7 illustrates a flowchart 700 that shows anti-virus scan on subfiles that have changed since a previous anti-virus scan, in accordance with certain embodiments. Control starts at block 702 in which execution of the secondary storage controller anti-virus application 114 is initiated. Control proceeds to block 704 in which a determination is made as to which subfiles have changed in the primary storage controller 102 since the last anti-virus scan on the secondary storage controller 104. The secondary storage controller anti-virus application 114 is executed (at block 706) to scan the subfiles that have changed in the primary storage controller 102 since the last anti-virus scan on the secondary storage controller 104.

Figure 8:
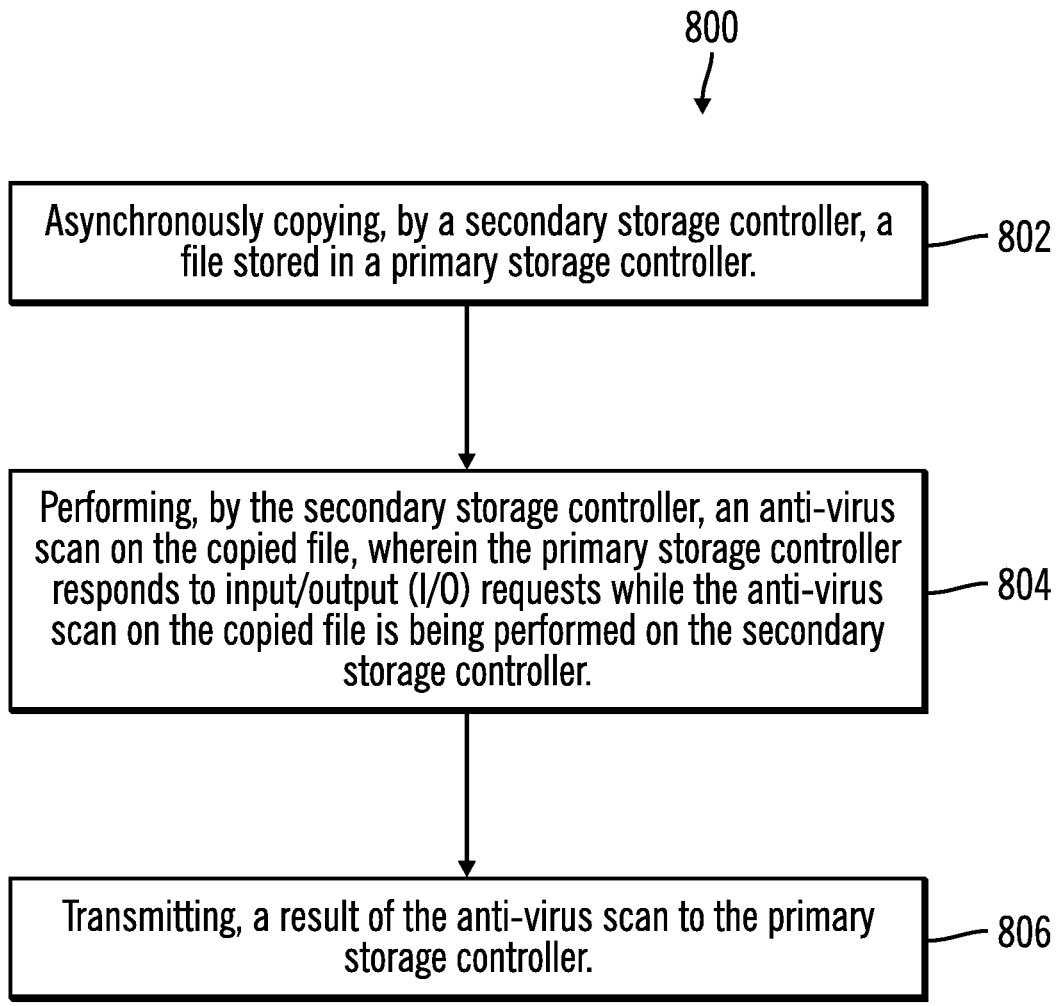
FIG. 8 illustrates a block diagram that shows operations that relate to an anti-virus scan via a secondary storage controller that maintains an asynchronous copy of data of a primary storage controller, in accordance with certain embodiments.

FIG. 8 illustrates a block diagram 800 that shows operations that relate to an anti-virus scan via a secondary storage controller 104 that maintains an asynchronous copy of data of a primary storage controller 102, in accordance with certain embodiments. The operations shown in FIG. 8 may be performed by the secondary storage controller 104.

Control starts at block 802 in which a secondary storage controller 104 asynchronously copies a file stored in a primary storage controller 102. The secondary storage controller 104 performs (at block 804) an anti-virus scan on the copied file, wherein the primary storage controller 102 responds to I/O requests while the anti-virus scan on the copied filed is being performed on the secondary storage controller 104. Control proceeds to block 806, in which a result of the anti-virus scan is transmitted to the primary storage controller 102.

Therefore, FIGS. 1-8 illustrate certain embodiments in which a primary storage controller 102 offloads anti-virus scanning to a secondary storage controller 104, where the secondary storage controller 104 stores asynchronous copies of files of the primary storage controller 102. As a result, processing cycles are freed up of the primary storage controller 102. Additionally, I/O operations may be performed on the file while the virus-scan is running on the asynchronous copy of the file.

In certain embodiments, when an anti-virus scan request is initiated at the primary storage controller 102 an anti-virus control module 113 may assess current workloads on both external and internal antivirus clients (in a distributed anti-virus client environment) and identify the anti-virus clients which are available for assignment of the new anti-virus scan request. If no client can be identified at the time of the request, the scan goes into a queue for processing once an anti-virus client is freed up. In this situation, if the file associated with the queued scan request was configured with asynchronous replication such that a copy of the file resides on a secondary storage controller 104, certain embodiments provide a mechanism for reducing and in some cases avoiding processing delays because of an unavailability of anti-virus scans clients. The anti-virus control module 113 may forward the scan request to the secondary storage controller 104 via existing communication channels configured as part of asynchronous replication.

The anti-virus application 114 at the secondary storage controller 104 may begin processing the scan directly on the local replicated copy of the source file, and eliminate any need to transfer data to the anti-virus client. This results in an increase of the anti-virus scan bandwidth of the primary storage controller 102 by the number of available interface nodes on the secondary storage controller 104 which may otherwise be left unused. In certain embodiments, the anti-virus control module 113 may be configured to specify which types of files are to be scanned at the secondary storage controller 104. In such embodiments, processor cycle consumption on the primary storage controller 102 is reduced by the scanning of less critical files in the secondary storage controller 104.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
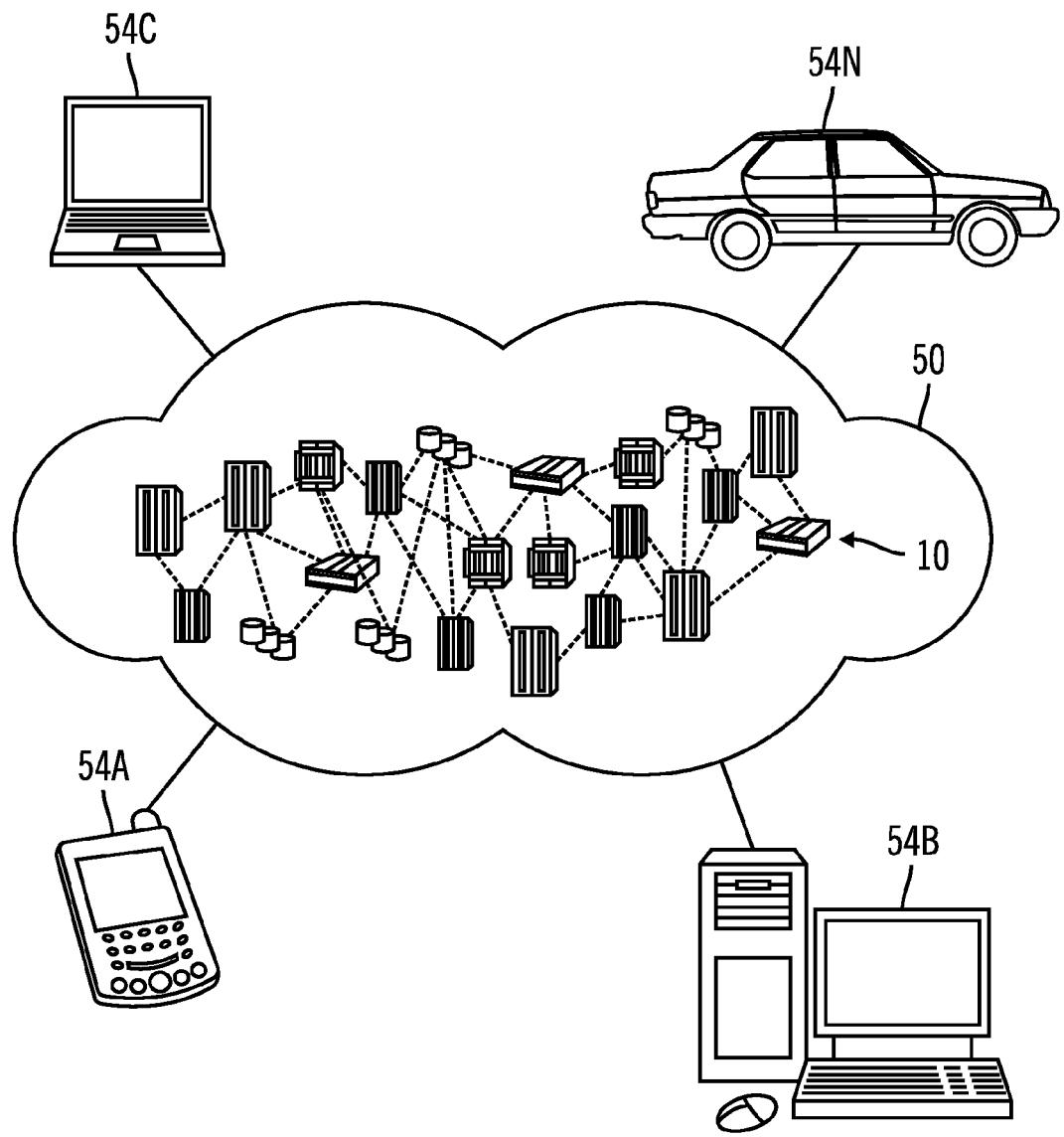
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
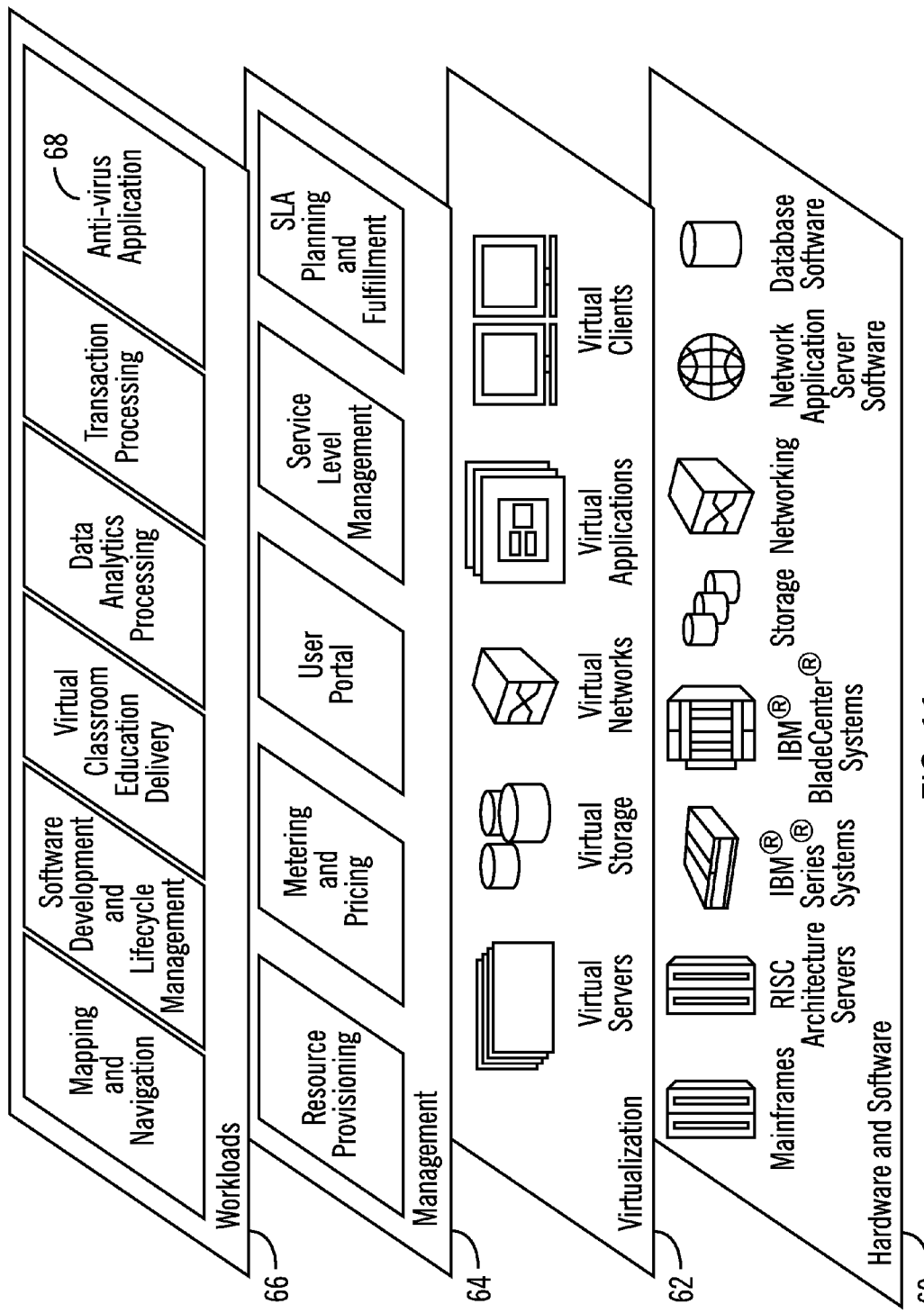
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and anti-virus application 114 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
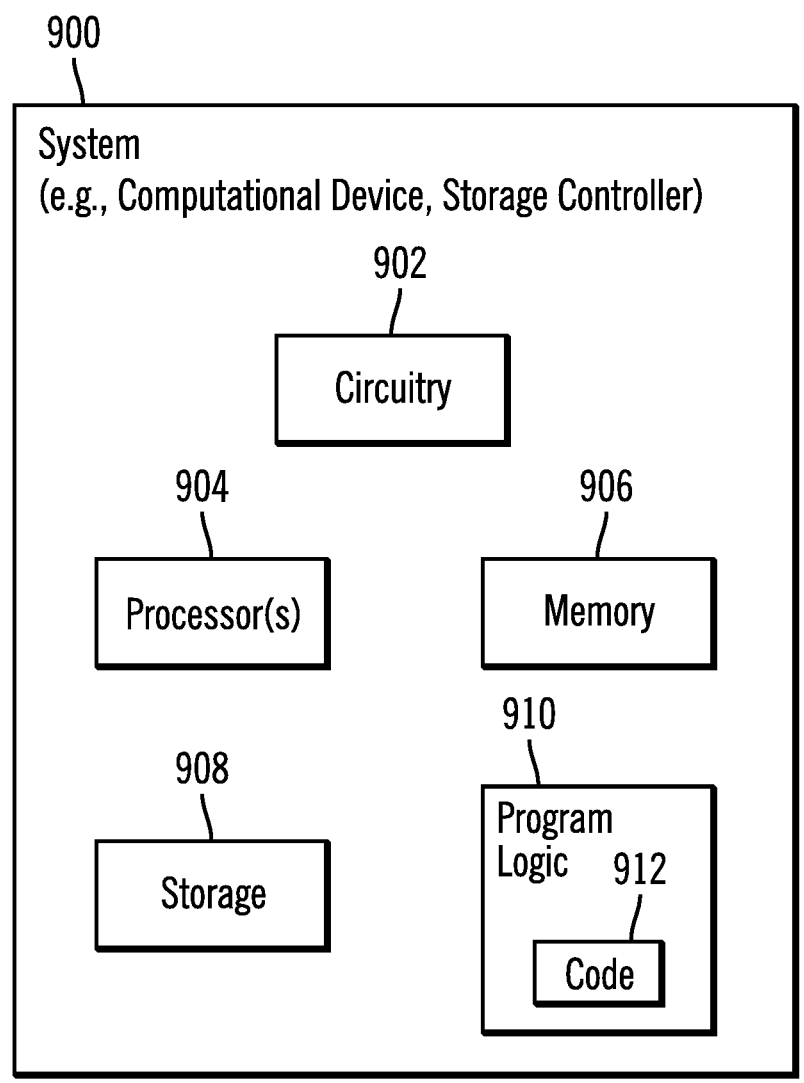
FIG. 9 illustrates a block diagram of a computational system that shows certain elements that may be included in the primary storage controller, the secondary storage controller, or the computational device shown in FIG. 1, in accordance with certain embodiments.

FIG. 9 illustrates a block diagram that shows certain elements that may be included in the storage controllers 102, 104 or the computational device 106 in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   maintaining a primary storage controller and a secondary storage controller, wherein files are copied asynchronously from the primary storage controller to the secondary storage controller;
   in response to receiving by the primary storage controller a request to perform an anti-virus scan on a file stored in the primary storage controller, determining, by the primary storage controller, whether an asynchronous copy of the file is stored in a secondary storage controller;
   in response to determining, by the primary storage controller, that the asynchronous copy of the file is stored in the secondary storage controller, requesting, by the primary storage controller to the secondary storage controller to perform the anti-virus scan on the asynchronous copy of the file; and
   in response to determining, by the primary storage controller, that the asynchronous copy of the file is not stored in the secondary storage controller, initiating, by the primary storage controller an asynchronous copying of the file from the primary storage controller to the secondary storage controller, wherein in response to initiating the asynchronous copying, performing:
   copying, by the secondary storage controller, the file stored in the primary storage controller;
   performing, by the secondary storage controller, the anti-virus scan on the copied file; and
   transmitting, a result of the anti-virus scan to the primary storage controller.

2. The method of claim 1, wherein the result includes an identification of a virus in the file, the method further comprising:
   determining, by the secondary storage controller, whether to repair the file and propagate changes to repair the file to the primary storage controller; and
   in response to determining not to repair the file and propagate the changes, performing:
      quarantining, the file, by the secondary storage controller;
      communicating, the identification of the virus to the primary storage controller; and
      receiving, by the secondary storage controller, changes to be made based on analysis of the virus at the primary storage controller.

3. The method of claim 2, the method further comprising:
   in response to determining to repair the file and propagate the changes, performing:
   repairing, by the secondary storage controller, the file; and
   transmitting changes to repair the file to the primary storage controller.

4. The method of claim 1, wherein the file is comprised of a plurality of subfiles that are portions of the file, and wherein during a subsequent anti-virus scan, the subfiles that have changed since the anti-virus scan are scanned to determine viruses, and the subfiles that have not changed since the anti-virus scan are not scanned to determine viruses.

5. The method of claim 1, the method further comprising:
   maintaining a first anti-virus control module at the primary storage controller;
   maintaining a second anti-virus control module at the secondary storage controller; and
   configuring the first anti-virus control module to specify which types of files are to be scanned for virus at the secondary storage controller.

6. The method of claim 5, wherein relatively less critical files are scanned for virus at the secondary storage controller in comparison to the primary storage controller.

7. The method of claim 5, the method further comprising:
   assessing, by the first anti-virus control module of the primary storage controller, current workloads on anti-virus clients in a distributed anti-virus client environment to determine which anti-virus clients are available for assignment of the request to perform the anti-virus scan on the file; and
   in response to determining that no anti-virus clients are available for assignment of the request to perform the anti-virus scan on the file, forwarding the anti-virus scan request to the secondary storage controller if the file for the anti-virus scan request is configured for asynchronous copying.

8. A system, comprising:
a memory; and
a processor coupled to the memory, wherein the processor performs operations, the operations comprising:
maintaining a primary storage controller and a secondary storage controller, wherein files are copied asynchronously from the primary storage controller to the secondary storage controller;
in response to receiving by the primary storage controller a request to perform an anti-virus scan on a file stored in the primary storage controller, determining, by the primary storage controller, whether an asynchronous copy of the file is stored in a secondary storage controller;
in response to determining, by the primary storage controller, that the asynchronous copy of the file is stored in the secondary storage controller, requesting, by the primary storage controller to the secondary storage controller to perform the anti-virus scan on the asynchronous copy of the file; and
in response to determining, by the primary storage controller, that the asynchronous copy of the file is not stored in the secondary storage controller, initiating, by the primary storage controller an asynchronous copying of the file from the primary storage controller to the secondary storage controller, wherein in response to initiating the asynchronous copying, performing:
copying, by the secondary storage controller, the file stored in the primary storage controller;
performing, by the secondary storage controller, the anti-virus scan on the copied file; and
transmitting, a result of the anti-virus scan to the primary storage controller.

9. The system of claim 8, wherein the result includes an identification of a virus in the file, the operations further comprising:
determining, by the secondary storage controller, whether to repair the file and propagate changes to repair the file to the primary storage controller; and
in response to determining not to repair the file and propagate the changes, performing:
quarantining, the file, by the secondary storage controller;
communicating, the identification of the virus to the primary storage controller; and
receiving, by the secondary storage controller, changes to be made based on analysis of the virus at the primary storage controller.

10. The system of claim 9, the operations further comprising:
in response to determining to repair the file and propagate the changes, performing:
repairing, by the secondary storage controller, the file; and
transmitting the changes to repair the file to the primary storage controller.

11. The system of claim 8, wherein the file is comprised of a plurality of subfiles that are portions of the file, and wherein during a subsequent anti-virus scan, the subfiles that have changed since the anti-virus scan are scanned to determine viruses, and the subfiles that have not changed since the anti-virus scan are not scanned to determine viruses.

12. The system of claim 8, the operations further comprising:
maintaining a first anti-virus control module at the primary storage controller;
maintaining a second anti-virus control module at the secondary storage controller; and
configuring the first anti-virus control module to specify which types of files are to be scanned for virus at the secondary storage controller.

13. The system of claim 12, wherein relatively less critical files are scanned for virus at the secondary storage controller in comparison to the primary storage controller.

14. The system of claim 12, the operations further comprising:
assessing, by the first anti-virus control module of the primary storage controller, current workloads on anti-virus clients in a distributed anti-virus client environment to determine which anti-virus clients are available for assignment of the request to perform the anti-virus scan on the file; and
in response to determining that no anti-virus clients are available for assignment of the request to perform the anti-virus scan on the file, forwarding the anti-virus scan request to the secondary storage controller if the file for the anti-virus scan request is configured for asynchronous copying.

15. A computer program product, the computer program product comprising:
a computer readable storage medium having computer readable program code embodied therewith, the computer readable program code configured to perform operations on a processor, the operations comprising:
maintaining a primary storage controller and a secondary storage controller, wherein files are copied asynchronously from the primary storage controller to the secondary storage controller;
in response to receiving by the primary storage controller a request to perform an anti-virus scan on a file stored in the primary storage controller, determining, by the primary storage controller, whether an asynchronous copy of the file is stored in a secondary storage controller;
in response to determining, by the primary storage controller, that the asynchronous copy of the file is stored in the secondary storage controller, requesting, by the primary storage controller to the secondary storage controller to perform the anti-virus scan on the asynchronous copy of the file; and
in response to determining, by the primary storage controller, that the asynchronous copy of the file is not stored in the secondary storage controller, initiating, by the primary storage controller an asynchronous copying of the file from the primary storage controller to the secondary storage controller, wherein in response to initiating the asynchronous copying, performing:
copying, by the secondary storage controller, the file stored in the primary storage controller;
performing, by the secondary storage controller, the anti-virus scan on the copied file; and
transmitting, a result of the anti-virus scan to the primary storage controller.

16. The computer program product of claim 15, wherein the result includes an identification of a virus in the file, the operations further comprising:
determining, by the secondary storage controller, whether to repair the file and propagate changes to repair the file to the primary storage controller; and
in response to determining not to repair the file and propagate the changes, performing:
quarantining, the file, by the secondary storage controller;

communicating, the identification of the virus to the primary storage controller; and receiving, by the secondary storage controller, changes to be made based on analysis of the virus at the primary storage controller.

17. The computer program product of claim 16, the operations further comprising:

in response to determining to repair the file and propagate the changes, performing:

repairing, by the secondary storage controller, the file; and transmitting the changes to repair the file to the primary storage controller.

18. The computer program product of claim 15, wherein the file is comprised of a plurality of subfiles that are portions of the file, and wherein during a subsequent anti-virus scan, the subfiles that have changed since the anti-virus scan are scanned to determine viruses, and the subfiles that have not changed since the anti-virus scan are not scanned to determine viruses.

19. The computer program product of claim 15, the operations further comprising:

maintaining a first anti-virus control module at the primary storage controller;

maintaining a second anti-virus control module at the secondary storage controller; and configuring the first anti-virus control module to specify which types of files are to be scanned for virus at the secondary storage controller.

20. The computer program product of claim 19, wherein relatively less critical files are scanned for virus at the secondary storage controller in comparison to the primary storage controller.

21. The computer program product of claim 19, the operations further comprising:

assessing, by the first anti-virus control module of the primary storage controller, current workloads on anti-virus clients in a distributed anti-virus client environment to determine which anti-virus clients are available for assignment of the request to perform the anti-virus scan on the file; and in response to determining that no anti-virus clients are available for assignment of the request to perform the anti-virus scan on the file, forwarding the anti-virus scan request to the secondary storage controller if the file for the anti-virus scan request is configured for asynchronous copying.

* * * * *